United States Patent [19]

Dobler et al.

[11] Patent Number: 4,866,418
[45] Date of Patent: Sep. 12, 1989

[54] ARRANGEMENT FOR AUTOMATIC RELEASE OF OCCUPANT PROTECTING DEVICES IN THE EVENT OF ACCIDENT

[75] Inventors: Klaus Dobler, Gerlingen; Hansjörg Hachtel, Weissach, both of Fed. Rep. of Germany

[73] Assignee: Robert Bosch GmbH, Stuttgart, Fed. Rep. of Germany

[21] Appl. No.: 213,616

[22] Filed: Jun. 30, 1988

[30] Foreign Application Priority Data

Aug. 26, 1987 [DE] Fed. Rep. of Germany ....... 3728382

[51] Int. Cl.⁴ .............................................. B60R 25/10
[52] U.S. Cl. .................................... 340/429; 340/436; 340/683; 340/689; 340/669; 340/665; 200/61.45 R; 180/271; 180/282; 280/735; 280/806
[58] Field of Search .................. 340/524 M, 689, 683, 340/665, 669; 73/514, 517 B, 517 R; 200/61.45 R, 61.45 M; 180/172, 271, 282; 280/735, 802, 806

[56] References Cited

U.S. PATENT DOCUMENTS 3,600,954  8/1971  Clarke .............................. 73/517 R
3,678,763  7/1972  Brooks et al. ....................... 73/514
3,867,844  2/1975  Shimizu et al. .................... 73/517 R

FOREIGN PATENT DOCUMENTS 3342186  5/1985  Fed. Rep. of Germany .

Primary Examiner—Donnie L. Crosland
Attorney, Agent, or Firm—Michael J. Striker

[57] ABSTRACT

An arrangement for automatic release of occupant protecting devices in vehicles, particularly power vehicles, by means of producing a control signal in response to a deviation from an acceptable position or an acceptable condition of a vehicle, the arrangement comprises a sensor including a base plate provided with at least one coil through which a high-frequency alternating current flows, a seismic mass composed of an electrically conductive material at least in the region of the coil and movably suspended near the base plate so as to be in an operative connection with the coil, a pendulum-like suspending member which supports the seismic mass so as to enable a substantially parallel movement of the seismic mass relative to the coil, and a perforated member which coats the coil, the perforated member being composed of an electrically conductive material and provided with at least one slot.

10 Claims, 2 Drawing Sheets

14

ARRANGEMENT FOR AUTOMATIC RELEASE OF OCCUPANT PROTECTING DEVICES IN THE EVENT OF ACCIDENT

BACKGROUND OF THE INVENTION

The present invention relates to an arrangement for automatic release of occupant protecting devices in the event of an accident in vehicles, especially power vehicles.

It is known to determine the deviation of a position sensor with the aid sensors arranged in corners of a rectangle. The produced signals are evaluated in an evaluating circuit, and the changes in the sensor signals which are dependent on the distance of the position sensor from the corners of the rectangular surface is utilized as a value for the distance and as a control signal for a correcting member. The arrangement is however relatively complicated and also expensive for a mass installation in power vehicles as a releasing device.

The German document DE-OS No. 3,342,186 discloses an acceleration pick-up which operates on the principle of eddy currents. In this pick-up a seismic mass is arranged on a bending spring. Its distance to a coil through which a high frequency alternating current flows changes because of the accelerating force acting on it. However, in this construction a change of the distance is possible only perpendicularly to the plane of the coil. The power of the magnetic field is uniformly distributed over the whole surface of the seismic mass. A concentration of the field lines through a perforated member which coats the coil and is provided with a slot is not possible.

U.S. Pat. No. 3,678,763 describes an acceleration pick-up which has a mass suspended on a pendulum. With the aid of a permanent magnet, the seismic mass is fixed in an initial position and produces a measuring signal upon exceeding a predetermined threshold. Predetermined mechanical contacts are then closed by the seismic mass.

SUMMARY OF THE INVENTION

Accordingly, it is an object of the present invention to provide an arrangement for automatic release of occupant protecting devices in the event of an accident, which avoids the disadvantages of the prior art.

In keeping with these objects and with others which will become apparent hereinafter, one feature of the present invention resides, briefly stated, in an arrangement in which a seismic mass which is in an operative connection with the coil is suspended on an arrangement for automatic release of occupant protecting devices in vehicles, particularly power vehicles, by means of producing a control signal in response to a deviation from an acceptable position or an acceptable condition of a vehicle, the arrangement comprising a sensor including a base plate provided with at east one coil through which· a high-frequency alternating current flows; a seismic mass composed of an electrically conductive material at least in the region of the coil and movably suspended near the base plate so as to be in an operative connection with the coil; a pendulum-like suspending member which supports the seismic mass so as to enable a substantially parallel movement of the seismic mass relative to the coil; and a perforated member which coats the coil, the perforated member being composed of an electrically conductive material and provided with at least one slot.

When the arrangement is designed in accordance with the present invention it guarantees a release of the safety systems, regardless of the direction of the acting acceleration.

For releasing the safety systems, such as an air bag or a safety belt, it is not necessary to determine the direction of the applied acceleration or its exact position.

In accordance with another especially advantageous feature of the present invention, the slot of the perforated member applied on the coil is ring-shaped and located in the region of the edges of the electrically conductive material of the seismic mass. In such construction, a predetermined release gate is provided and clearly recognized.

The seismic mass can be provided at its facing toward the coil with a layer of an electrically conductive material. On the other hand, it can be composed of an electrically conductive and non-magnetic material as a whole.

The coil can be applied on the base plate in a spiral-shaped fashion.

The suspending member can be bar-shaped with a round cross-section. On the other hand, the suspending member can have such a cross-section that it has different resistance moments in two mutually transverse directions corresponding to the traverse directions of the base plate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
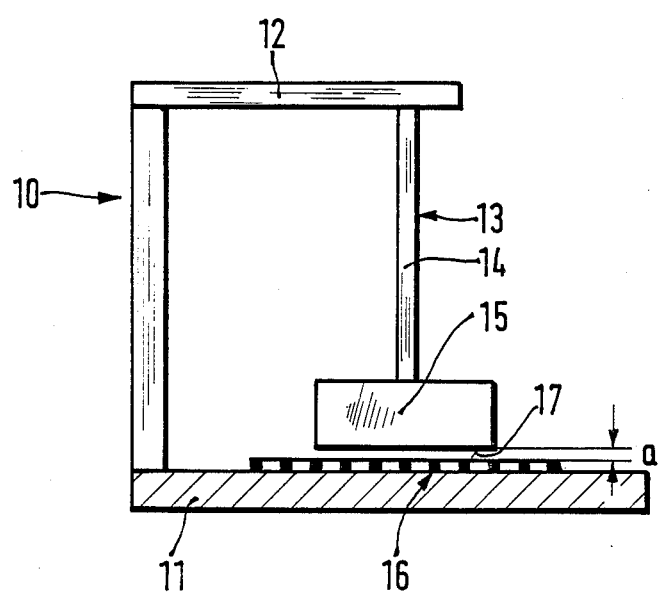
FIG. 1 is a view showing a longitudinal section of an arrangement for automatic release of occupant protecting devices in accordance with the present invention.

An arrangement for automatic release of occupant protecting devices in the event of an accident has a sensor which is identified with reference numeral 10 in FIG. 1. The sensor 10 serves for releasing of occupant protecting devices, for example an airbag or a safety belt in power vehicles. It has a base plate 11 and a frame 12. A spring mass system 13 is mounted on the frame 12. The spring mass system has an elastic pendulum-like suspending element 14 and a body which is suspended on the suspending element 14 and acts as a seismic mass 15. The seismic mass is elastically anchored in a region outside of a mass center point of a mass including the mass center point together with the suspending member.

A coil 16 is arranged on the base plate 11 in the region of the seismic mass 15. The coil 16 is produced by etching, pressing, evaporation or similar known processes.

Figure 3:
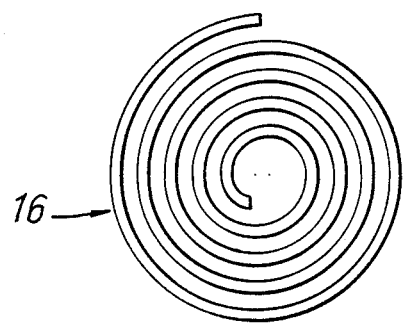
FIG. 3 is a view showing a coil on a base plate of a sensor of the inventive arrangement.

It can be applied on the base plate as a spiral, as shown in FIG. 3. The coil 16 shown in FIG. 1 is circular. However, it is possible to provide the coil of a different shape, for example oval or rectangular. The shape of the coil 16 is dependent on whether a special deviating direction must be preferably indicated, as will be explained hereinbelow. The seismic mass 15 is suspended on the suspending element 14 so that it can perform approximately parallel movements relative to the coil 16.

The mass 15 is provided with a layer 17 of an electrically conductive material on its side facing toward the coil 16, for example iron, copper, aluminum. The seismic mass 15 can, however, be also composed completely of an electrically conductive material, such as non-ferrous metals, light metals and their alloys. What is important is that the distance "a" between the seismic mass 15 and the outer surface of the coil 16 is as small as possible and is also as uniform as possible over the whole region.

When a high-frequency alternating current flows through the coil 16, eddy currents are formed on the upper surface of the seismic mass 15, or in other words, of the electrically conductive material. If the seismic mass 15 is deviated from its normal position under the action of an occurring acceleration, then the eddy current formation on the outer surface of the seismic mass 15 changes. The deviation of the seismic mass 15 is dependent in a static analysis on the angular position $\phi$ and in a dynamic analysis on the angular acceleration $\phi$ and/or the linear acceleration x or y. By the change of the eddy current formation, the impedance of the coil 16 changes. Thereby the changing amplitude of the carrier frequency of the coil 16 can be used as a measuring signal for the displacement of the seismic mass 15 from a central point of the coil. It is known that during, a reduction of the eddy current formation, an increase in the inductivity of the coil 16 occurs, when a high frequency alternating current flows through the windings of the coil 16. The distance "a" between the coil 16 and the lower edge of the seismic mass 15 must be formed therefore as small as possible.

Figure 2:
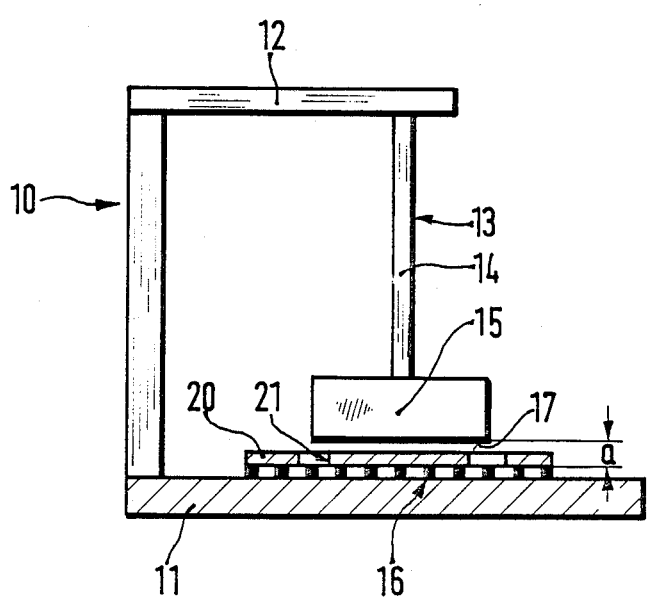
FIG. 2 is a view showing the inventive arrangement for automatic release of occupant protecting devices in accordance with another embodiment of the invention.

The embodiment shown in FIG. 2 is especially advantageous. In this embodiment the part which is similar to the parts of the embodiment of FIG. 1 are identified with the same reference numerals. The coil 16 in FIG. 2 is coated with the aid of a masking 20, or in other words a layer of an electrically conductive material. The masking 20 has an annular gap 21 substantially in the region of the edges of the seismic mass 15. Since in the remaining region the coil 16 is completely coated, the field lines can extend only here in a concentrated manner. The seismic mass 15 is thereby deviated respectively in the region of the stronger field lines. Thereby even in the sent of small displacement of the seismic mass 15, high measuring signals are produced. This is especially important and advantageous when the elastic suspending member 15 must be formed very rigid. Thereby a high own frequency of the spring mass system 13 can be obtained.

Figure 4:
FIGS. 4 and 5 show two embodiments of a suspending member of the inventive arrangement.

When the suspending member 14 has a round cross-section as shown in FIG. 4, the deviation of the mass 15 is independent of the direction; in other words acceleration or position changes act with the same magnitude in all directions.

Figure 5:

It is however possible to form the suspending member 14 as a pipe or a bar with a rectangular cross-section as shown in FIG. 5. Thereby, a specialized direction-dependent sensitivity of the sensor 10 is obtained. The acceleration which acts transversely to the respective longer edge can thereby release preferably the safety system.

The produced measuring signal is supplied to a not shown evaluating circuit, which then releases the respective occupant protecting device for the power vehicle.

It will be understood that each of the elements described above, or two or more together, may also find a useful application in other types of constructions differing from the types described above.

While the invention has been illustrated and described as embodied in an arrangement for automatic release of occupant protecting devices in the event of an accident, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for automatic release of occupant protecting devices in vehicles, particularly power vehicles, by means of producing a control signal in response to a deviation from an acceptable position or an acceptable condition of a vehicle, the arrangement comprising a sensor including a base plate provided with at least one coil through which a high-frequency alternating current flows; a seismic mass composed of an electrically conductive material at least in the region of said coil and movably suspended near said base plate so as to be in an operative connection with said coil; a pendulum-like suspending member which supports said seismic mass so as to enable a substantially parallel movement of said seismic mass relative to said coil; and a perforated member which coats said coil, said perforated member being composed of an electrically conductive material and provided with at least one slot.

2. An arrangement as defined in claim 1, wherein said seismic mass is elastically anchored in a region outside of a mass center point of a mass including said seismic mass together with said suspending member.

3. An arrangement as defined in claim 1, wherein said slot of said perforated member is formed as a ring-shaped slot.

4. An arrangement as defined in claim 3, wherein said seismic mass in said region of an electrically conductive material has edges which are located in the region of said slot of said perforated member.

5. An arrangement as defined in claim 1, wherein said mass has a side facing towards said coil and is provided at said side with a layer of an electrically conductive material.

6. An arrangement as defined in claim 1, wherein said seismic mass is composed as a whole of an electrically conductive non-magnetic material.

7. An arrangement as defined in claim 1, wherein said coil is arranged on said base plate in a spiral-shaped manner.

8. An arrangement as defined in claim 1, wherein said suspending member is bar-shaped and has a round cross-section.

9. An arrangement as defined in claim 1, wherein said base plate extends in a plane having two mutually transverse directions, said suspending member being bar-shaped and formed so that moments of resistance of said suspending member are different in said directions.

10. An arrangement as defined in claim 9, wherein said suspending member has a cross-section with two mutually transverse dimensions which are different in said transverse directions of said plane of said base plate.

* * * * *